Aug. 26, 1924.

A. T. PENCE 1,506,079

MECHANICAL STOCK FEEDER

Filed Oct. 4 1923  2 Sheets-Sheet 2

Inventor
Allen T. Pence,

Toulmin & Toulmin
Attorneys

Patented Aug. 26, 1924.

1,506,079

UNITED STATES PATENT OFFICE.

ALLEN T. PENCE, OF HILLSBORO, OHIO, ASSIGNOR OF ONE-FIFTH TO A. B. SIMPSON, ONE-TENTH TO JOSEPH GAVEY, ONE-TENTH TO F. F. STEVENS, ONE-FIFTH TO WILLIAM R. LUKENS, AND ONE-FIFTH TO ROBERT B. McMULLEN, ALL OF HILLSBORO, OHIO.

MECHANICAL STOCK FEEDER.

Application filed October 4, 1923. Serial No. 666,646.

*To all whom it may concern:*

Be it known that I, ALLEN T. PENCE, a citizen of the United States, residing at Hillsboro, in the county of Highland and State of Ohio, have invented certain new and useful Improvements in Mechanical Stock Feeders, of which the following is a specification, reference being had therein to the accompanying drawing.

My invention relates to mechanical stock feeders.

The object of my invention is to provide a stock feeder adaptable to the use of very heavy feeds.

It is also my object to provide a feeder which will deliver the feeds more rapidly than previously possible with similar types of stock feeders.

It is my object to provide a feeder in which the mechanism may be adjusted to varying characters of feed and varying speeds of feeding.

In particular, it is my object to provide means to steady the supporting means for supporting the agitator. I find that by providing such a steadying means to stabilize the movements of the feeder, heavier feeds may be used satisfactorily, and that feeds will be fed faster if this agitator-steadying means is employed.

Referring to the drawings.

Figure 1:
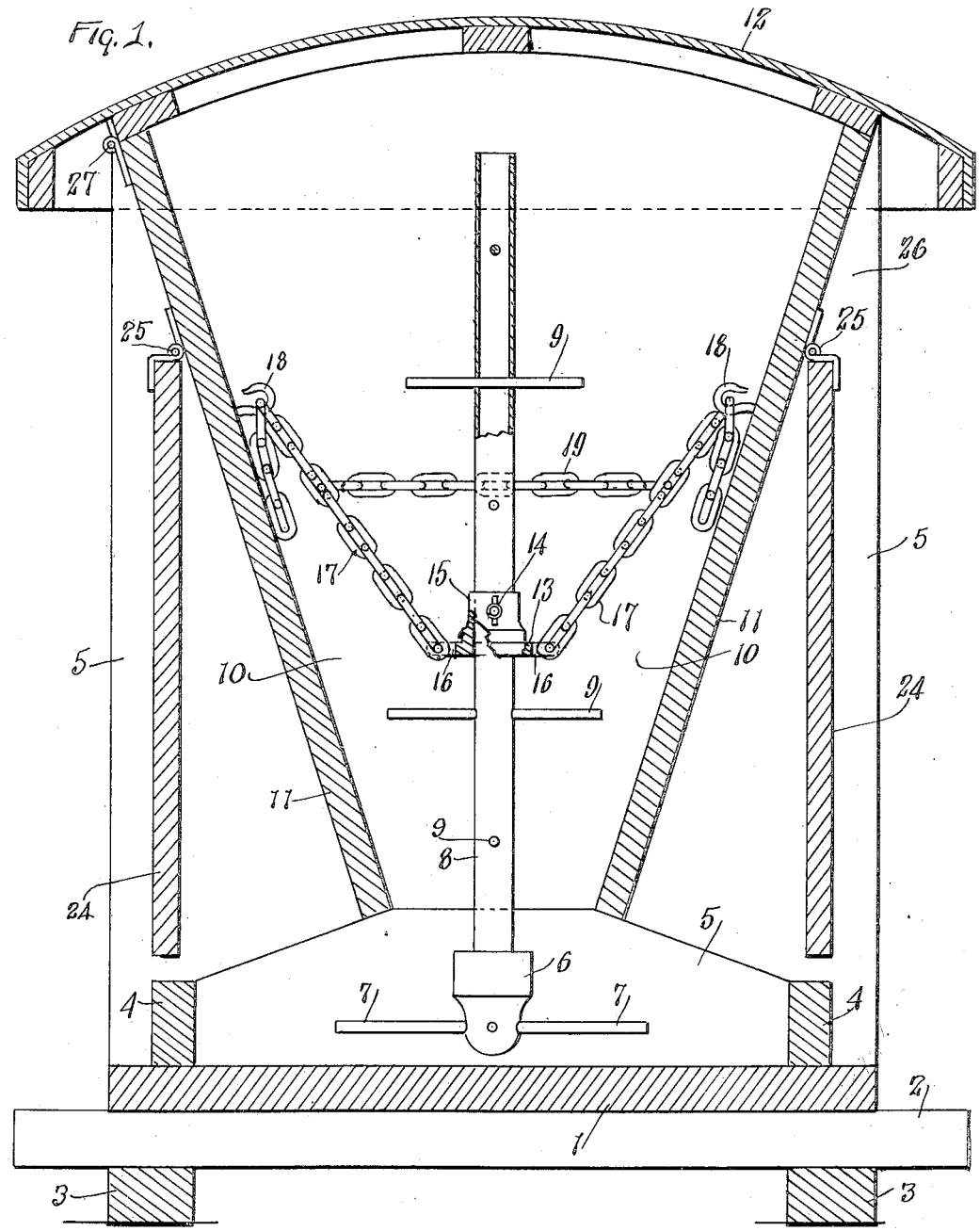
Figure 1 is a section through a typical feeder housing, showing the agitator in position and the steadying means therefor. This section is taken on the line 1—1 of Figure 3.
Figure 2:
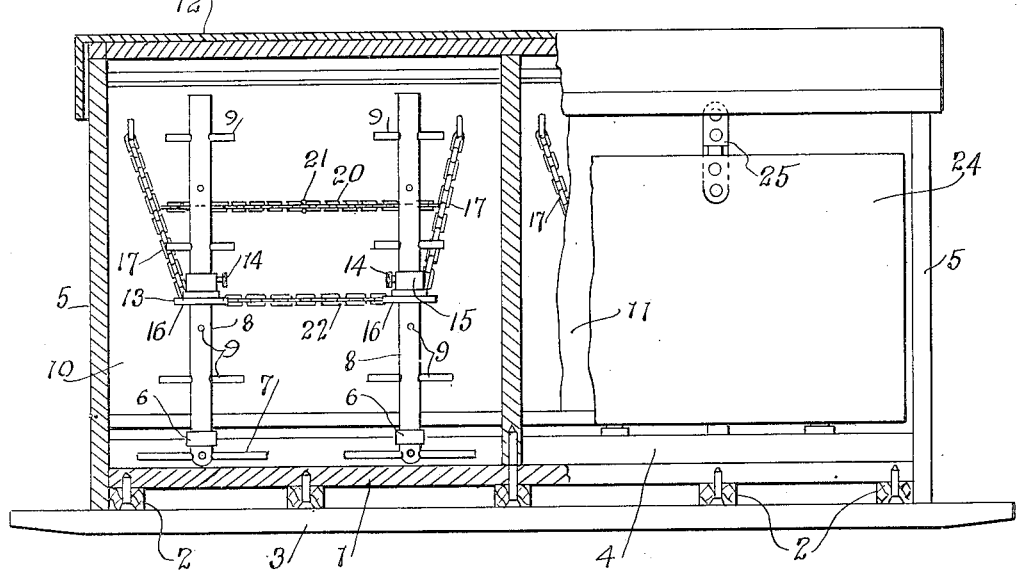
Figure 2 is a side elevation with a part of the housing in section, showing a double agitator with a similar arrangement of parts.
Figure 3:
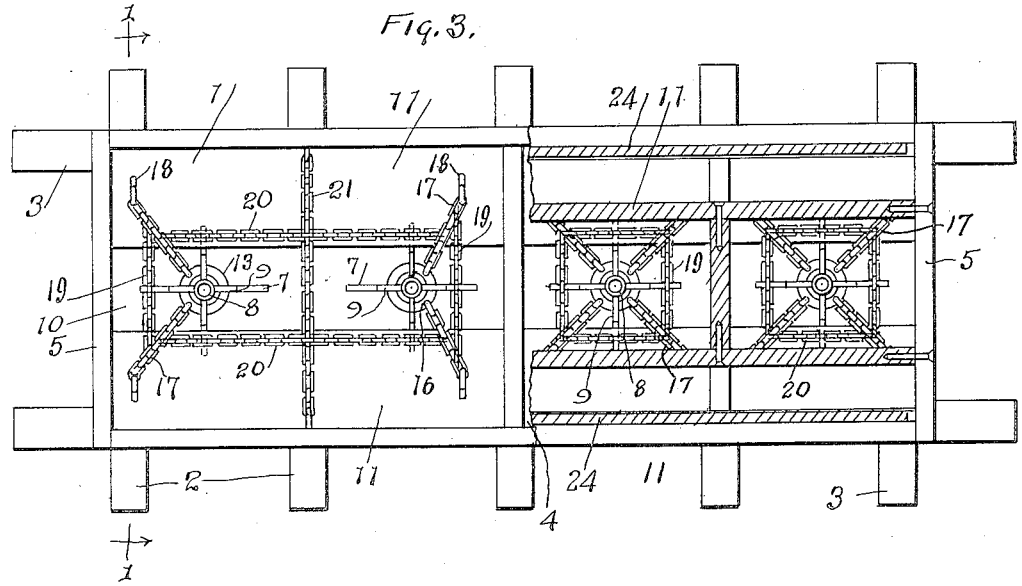
Figure 3 is a plan view partially in section of a feeder having double agitator and a single agitator.

It has been found that the steadying of the supporting means for the agitators results in a more positive action of the agitators in mixing and moving the feed.

Referring to the drawings in detail:

1 is a platform or floor mounted upon the supports 2, which are in turn mounted on blocks 3. This floor has side walls 4, which are stationary, and end walls 5, thus forming a compartment for the feed. Projecting into this feed compartment is the agitator head 6, having agitator arms 7, the whole being carried upon the agitator shaft 8. This shaft is provided with a plurality of arms 9 located at right angles to one another. These arms serve as stirrers for further agitating the feed in the hopper 10, formed by the sloping side walls 11, upon which side walls is mounted the roof 12. A plate 13 is fixed to the agitator shaft 8 by a bolt or set-screw 14, which works in a collar 15 connected to the plate 13. The plate 13 is provided with a number of eyes 16 in which are located the diagonal suspending chains 17. The upper ends of these chains are hooked on the hooks 18 carried by the side walls 11 of the hopper. About two thirds the distance from the bottom of the chains to the top are located cross chains 19, which constitute the steadying means heretofore referred to.

While it is not absolutely essential to have these chains at this exact location, it is preferable to have them about two thirds of the distance from the connection of the diagonal chains with the stirrer shaft. The diagonal chains may be adjusted in length according to the location of the particular link in the chain on the hook 18.

In the double feeder or stirrer, it will be observed that the longitudinal chains 20 extend from each feeder unit to the other, and that these two chains are joined together by the transverse chain 21.

In the single feeder, the steadying chains constitute a square, which is substantially divided into four parts by the diagonal suspending chains 17. When the feeders are in tandem the bars are connected by a cross chain 22, to further steady said bars.

It will be observed that the effect of these so-called steadying chains is to insure the bodily movement in a substantially vertical position of the agitator or stirrer shaft and its attendant mechanism.

The stock secures access to the feed compartment 5 by pushing against the swinging doors 24, hinged at 25, on the outside of the feed hopper. End walls 26 serve to support the hopper, and in turn the roof carried by the hopper, the roof being hinged to the hopper by the hinge 27, so that access to the interior of the hopper may be secured for loading it with feed.

From the foregoing description it will be understood that to gain access to the feed trough the animals will push inwardly on the doors 24 and will actuate the lower ends of the agitator bars 8 or the arms 7 carried by the same. The motion imparted to the agitator bars 8 by the stock in touching the same may be a rotary, oscillating or reciprocal movement, or a combination of these. The bars are connected to the plates 13 in such a manner that they may swing back and forth to agitate the meal in the entire hopper and cause it to flow by gravity into the feed trough. The particular arrangement of steadying chains constituting the present invention make the device applicable to the feeding of heavy hogs, in which case when the hog puts his snout in the trough his tendency to push the device too far and cause the feed to be pushed out of the trough is resisted.

It will be understood that I desire to comprehend within my invention such modifications as may be fairly embraced within it, and as may be found necessary in adapting it to various conditions in the art in the course of the application of the invention.

Having thus fully described my invention, what I claim as new, and desire to secure by Letters Patent, is:

1. In a mechanical feeder for stock, the combination with a hopper and a feed compartment, of an agitator suspended to move in said hopper and feed compartment, and adapted to agitate the feed therein, means in the feed hopper to suspend said agitator and means connected to said suspending means for steadying and guiding the movements of the agitator consisting of chains arranged to form a square.

2. In combination in a stock feeder, a feed compartment, a hopper adapted to deliver feed thereto, an agitator suspended in said hopper and feed compartment, said agitator having means thereon for moving the feed in the hopper and feed compartment when the animals feeding from the compartment move the agitator, means in the feed hopper to suspend the agitator, and steadying means attached to said suspending means consisting of chains arranged to form a square.

3. In a mechanical stock feeder, a feed compartment, a hopper mounted thereon having a restricted orifice over a part of the feed compartment, the remainder of the feed compartment being open for access thereto by stock, swinging doors closing access normally to the feed compartment by stock, an agitator shaft suspended in the feed compartment and hopper, a plurality of diagonal chains suspending the shaft and attached to the walls of the hopper, and a plurality of cross chains interconnecting each of the diagonal chains for steadying the agitator and the suspending diagonal chains.

4. In a mechanical stock feeder, a feed compartment, a hopper mounted thereover, a plurality of agitator shafts suspended in said hopper, having one end in said feed compartment, diagonal supporting chains supporting said agitators in said hopper and feed compartment, longitudinal chains connecting said agitators to one another through their suspending chains, steadying chains connecting the suspending chains to one another, and a transverse chain to steady the longitudinal chains.

5. In a mechanical feeder for stock, the combination with a hopper and a feed compartment, of an agitator suspended to move in said hopper and feed compartment and adapted to agitate the feed therein, and means connected to said suspending means for steadying and guiding the movements of the agitator consisting of chains located in different planes.

In testimony whereof, I affix my signature.

ALLEN T. PENCE.